US011545674B2

United States Patent
Kishi

(10) Patent No.: US 11,545,674 B2
(45) Date of Patent: Jan. 3, 2023

(54) ELECTRODE CATALYST LAYER AND POLYMER ELECTROLYTE FUEL CELL

(71) Applicant: TOPPAN PRINTING CO., LTD., Tokyo (JP)

(72) Inventor: Katsuyuki Kishi, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 246 days.

(21) Appl. No.: 16/465,115

(22) PCT Filed: Oct. 30, 2018

(86) PCT No.: PCT/JP2018/040320
§ 371 (c)(1),
(2) Date: May 29, 2019

(87) PCT Pub. No.: WO2019/088096
PCT Pub. Date: May 9, 2019

(65) Prior Publication Data
US 2019/0296367 A1    Sep. 26, 2019

(30) Foreign Application Priority Data

Oct. 31, 2017  (JP) .............................. JP2017-211041
May 29, 2018  (JP) .............................. JP2018-102420

(51) Int. Cl.
*H01M 4/92*    (2006.01)
*B01J 23/42*   (2006.01)
(Continued)

(52) U.S. Cl.
CPC ............. *H01M 4/926* (2013.01); *B01J 23/42* (2013.01); *H01M 4/86* (2013.01); *H01M 4/8828* (2013.01);
(Continued)

(58) Field of Classification Search
CPC ...... H01M 4/86; H01M 4/8828; H01M 4/926; H01M 8/10; H01M 8/1004; H01M 8/12;
(Continued)

(56) References Cited

U.S. PATENT DOCUMENTS 6,238,534 B1    5/2001  Mao et al.
2004/0166399 A1* 8/2004  Higami ................... H01M 4/90
                                                    429/128
(Continued)

FOREIGN PATENT DOCUMENTS

JP    H10-241703 A    9/1998
JP    2005-108551 A   4/2005
(Continued)

OTHER PUBLICATIONS

Lion (Lion EC carbon black product data sheet online WayBack evidence Sep. 7, 2016 {https://www.lion-specialty-chem.co.jp/en/product/carbon/carbon01.htm}).*
(Continued)

Primary Examiner — Brittany L Raymond
(74) Attorney, Agent, or Firm — Squire Patton Boggs (US) LLP

(57) ABSTRACT

Provided are an electrode catalyst layer for a polymer electrolyte fuel cell, which is capable of improving drainage property and gas diffusion properties and capable of high output, and a polymer electrolyte fuel cell provided with the same. An electrode catalyst layer (2, 3) bonded to a polymer electrolyte membrane (1) includes a catalyst (13), carbon particles (14), a polymer electrolyte (15) and fibrous material (16), in which the electrode catalyst layer (2,3) has a density falling within a range of 500 mg/cm$^3$ to 900 mg/cm$^3$, or has a density falling within a range of 400 mg/cm$^3$ to 1000 mg/cm$^3$, and the mass of the polymer electrolyte (15) falls within a range of 10 mass % to 200 mass % with respect to the total mass of the carbon particles (14) and the fibrous material (16).

10 Claims, 2 Drawing Sheets

(51) Int. Cl.
*H01M 4/88* (2006.01)
*H01M 8/1004* (2016.01)
*H01M 4/86* (2006.01)
*H01M 8/10* (2016.01)

(52) U.S. Cl.
CPC ............ *H01M 8/10* (2013.01); *H01M 8/1004* (2013.01); *H01M 2008/1095* (2013.01)

(58) Field of Classification Search
CPC ......... H01M 2008/1095; H01M 4/8673; B01J 23/42
See application file for complete search history.

(56) References Cited

U.S. PATENT DOCUMENTS

| | | | |
|---|---|---|---|
| 2006/0024563 A1* | 2/2006 | Ogura | H01M 4/8636 |
| | | | 429/437 |
| 2007/0128489 A1* | 6/2007 | Koyama | H01M 4/90 |
| | | | 429/483 |
| 2010/0009240 A1 | 1/2010 | Fly et al. | |
| 2010/0304240 A1* | 12/2010 | Koike | H01M 4/8657 |
| | | | 429/423 |
| 2015/0180047 A1 | 6/2015 | Hasegawa et al. | |
| 2017/0365862 A1* | 12/2017 | Yamasaki | H01M 8/02 |

FOREIGN PATENT DOCUMENTS

| | | | | |
|---|---|---|---|---|
| JP | 2006-278232 A | | 10/2006 | |
| JP | 5537178 B2 | | 7/2014 | |
| WO | WO 2016157746 | * | 6/2016 | ............. H01M 4/86 |

OTHER PUBLICATIONS

Supplementary European Search Report (SESR) dated Dec. 17, 2019, for Euroepan Patent Application No. 18873347.1, 12 pages.
International Search Report dated Jan. 29, 2019, in International Patent Application No. PCT/JP2018/040320, 1 page.

* cited by examiner

ELECTRODE CATALYST LAYER AND POLYMER ELECTROLYTE FUEL CELL

CROSS-REFERENCE

This application is a 35 U.S.C. 371 filing of International Application No. PCT/JP2018/040320 filed on Oct. 30, 2018, which claims priority to Japanese Application No. JP 2018-102420 filed on May 29, 2018, and Japanese Application No. JP 2017-211041 filed on Oct. 31, 2017, all of which are incorporated verbatim herein by reference in their entirety, including the specifications, drawings, and the claims.

TECHNICAL FIELD

The present invention relates to an electrode catalyst layer constituting a membrane electrode assembly for a polymer electrolyte fuel cell, and a polymer electrolyte fuel cell provided with the electrode catalyst layer.

BACKGROUND ART

In recent years, a fuel cell has attracted attention as the effective solution for environmental problems and energy problems. In the fuel cell, a fuel such as hydrogen is oxidized using an oxidizing agent such as oxygen, and the chemical energy associated therewith is converted into electric energy.

Depending on a type of electrolyte, the fuel cell is classified into an alkaline fuel cell, a phosphate fuel cell, a polymer fuel cell, a molten-carbonate fuel cell, a solid oxide fuel cell and the like. The polymer electrolyte fuel cell (PEFC) is expected to be applied as a portable power source, a stationary power source, and an automotive power source because it operates at a low temperature with high power density, and is capable of being reduced in size and weight.

The polymer electrolyte fuel cell (PEFC) has a membrane electrode assembly in which a polymer electrolyte membrane, which is an electrolyte membrane, is sandwiched between a pair of electrodes including a fuel electrode (anode) and an air electrode (cathode). By supplying a fuel gas containing hydrogen to the fuel electrode side and an oxidant gas containing oxygen to the air electrode side, electricity is generated by the following electrochemical reaction.

Anode: $H_2 \rightarrow 2H^+ + 2e^-$ (1)

Cathode: $\frac{1}{2}O_2 + 2H^+ + 2e^- \rightarrow H_2O$ (2)

The anode and the cathode respectively have a laminated structure of an electrode catalyst layer and a gas diffusion layer. The fuel gas supplied to an anode-side electrode catalyst layer becomes protons and electrons by the electrode catalyst (reaction 1). The protons pass through the polymer electrolyte and the polymer electrolyte membrane in the anode-side electrode catalyst layer and move to the cathode. The electrons pass through an external circuit and moves to the cathode. In a cathode-side electrode catalyst layer, protons, electrons, and the oxidant gas supplied from the outside are reacted to produce water (reaction 2). In this way, electricity is generated by the electrons passing through the external circuit.

Currently, a fuel cell that exhibits high power characteristics is desired to lower the cost of the fuel cell. However, since a lot of water is generated during the high power operation of the fuel cell, water floods on the electrode catalyst layer and the gas diffusion layer to cause flooding in which gas supply is inhibited. When flooding occurs, there is a problem that the power of the fuel cell drops remarkably.

For solving this problem, in PTLs 1 and 2, a catalyst layer containing carbons with different particle diameters or carbon fibers has been proposed.

CITATION LIST

Patent Literature

PTL 1: JP H10-241703 A
PTL 2: JP 5537178 B

SUMMARY OF INVENTION

Technical Problem

PTLs 1 and 2 recite that pores are generated in the electrode catalyst layer due to the inclusion of different carbon materials, and improvement in drainage properties and gas diffusion properties can be expected. However, those citations mention size, shape and content of the carbon material but with no descriptions on a structure of the catalyst layer, of which the effect has not been concretely verified.

The present invention has been made in view of such circumstances, and it is an object of the present invention to provide an electrode catalyst layer for a polymer electrolyte fuel cell, which is capable of improving drainage properties and gas diffusion properties and capable of high power, and a polymer electrolyte fuel cell provided with the same.

Solution to Problem

In order to solve the problem, one aspect of the present invention is an electrode catalyst layer bonded to a polymer electrolyte membrane, which includes a catalyst, carbon particles, a polymer electrolyte, and fibrous material, in which the electrode catalyst layer has a density falling within a range of 500 mg/cm³ to 900 mg/cm³.

Advantageous Effects of Invention

According to an aspect of the present invention, it is possible to provide an electrode catalyst layer for a polymer electrolyte fuel cell, which is capable of improving drainage properties and gas diffusion properties capable of high power, and a polymer electrolyte fuel cell provided with the same.

DESCRIPTION OF EMBODIMENTS

Embodiments of the present invention will now be described with reference to the drawings. It should be noted that the present invention is not limited to the embodiments described below. It is also possible to change or modify a design based on knowledge of those skilled in the art, and those modifications are also included in the scope of the present invention.

(Electrode Catalyst Layer)

Figure 1:
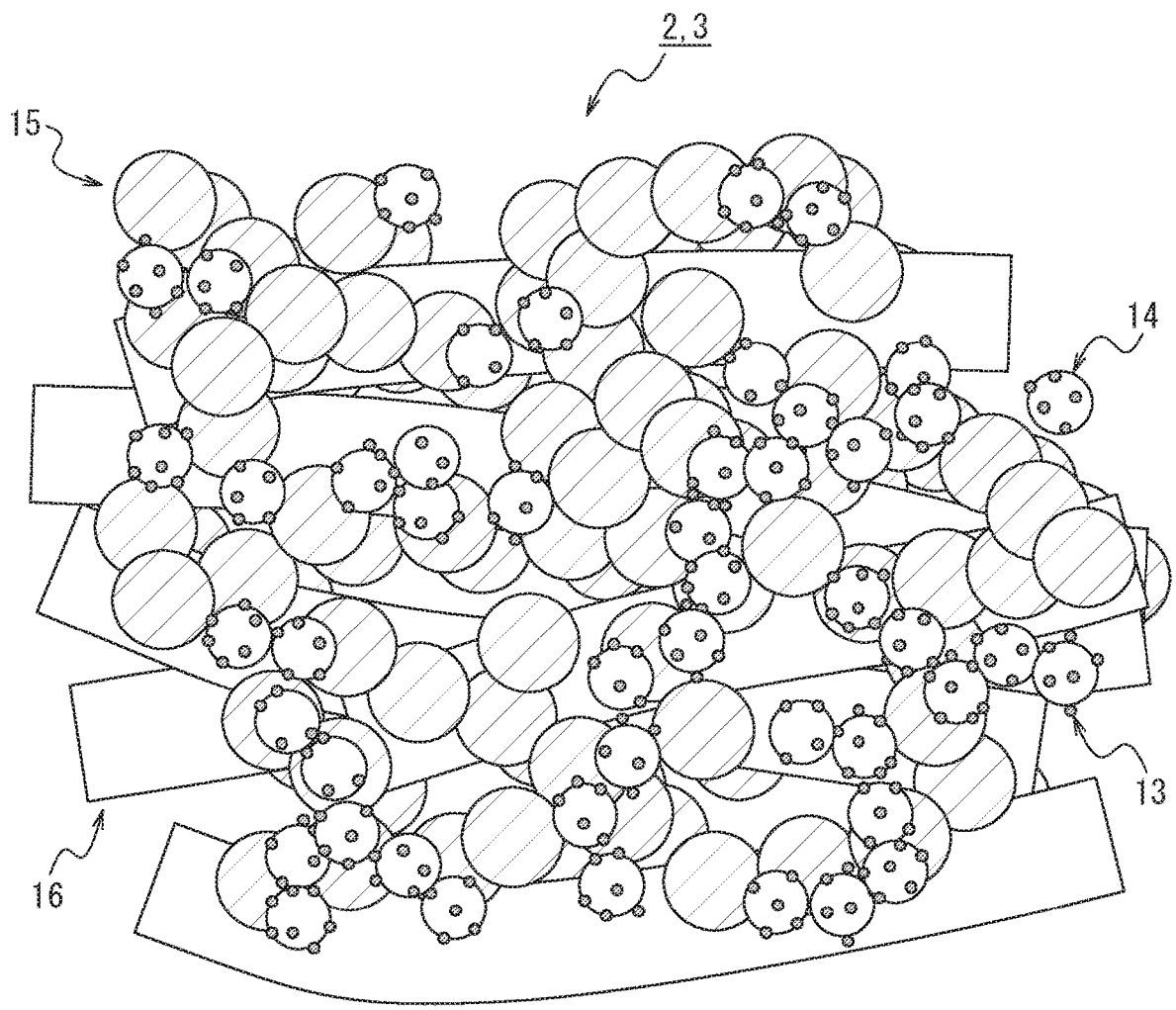
FIG. 1 is an exploded cross-sectional view illustrative of a configuration example of an electrode catalyst layer according to an embodiment of the present invention.

As shown in FIG. 1, electrode catalyst layers 2 and 3 for a polymer electrolyte fuel cell according to an embodiment (hereinafter referred to as "the embodiment") of the present invention respectively include a catalyst 13, carbon particles 14 carrying the catalyst 13, a polymer electrolyte 15 and fibrous material 16. A portion where none of the constituent elements described above exists forms a pore.

The electrode catalyst layers 2 and 3 according to the embodiment respectively has a density set to fall within a range of 400 mg/cm$^3$ to 1000 mg/cm$^3$, preferably a range of 500 mg/cm$^3$ to 900 mg/cm$^3$, more preferably a range of 600 mg/cm$^3$ to 900 mg/cm$^3$. By containing the fibrous material 16, cracks do not occur during formation, and pores in the electrode catalyst layers 2 and 3 can be increased. In a case where the density is less than 400 mg/cm$^3$, the electrode catalyst layers 2 and 3 are brittle, the pores are crushed during operation and the drainage property may be lowered. In a case where the density is more than 1000 mg/cm$^3$, the number of the pores is insufficient and the drainage property may be lowered.

The lowest density material among the commonly used materials is polypropylene. In a case where a dense (nonporous) layer is formed using polypropylene, its density is about 900 mg/cm$^3$ to 1000 mg/cm$^3$. Each of the catalyst 13, the carbon particles 14, the polymer electrolyte 15, and the fibrous material 16, constituting the electrode catalyst layers 2 and 3 according to the embodiment, is a material having higher density than polypropylene. Therefore, it is impossible to prepare a dense (nonporous) electrode catalyst layer satisfying a condition of the density of 400 mg/cm$^3$ to 1000 mg/cm$^3$, more strictly 500 mg/cm$^3$ to 900 mg/cm$^3$, with the material described above. That is, in a case where a dense layer is formed using commonly used materials, the density of the electrode catalyst layers 2, 3 according to the embodiment cannot be achieved, and therefore the electrode catalyst layers 2 and 3 according to the embodiment contain the pores.

The electrode catalyst layers 2 and 3, respectively, may be a single layer or multiple layers, and the density may be uniform, nonuniform or different. The density of the respective electrode catalyst layers 2 and 3 is preferably larger on a side of the polymer electrolyte membrane 1 and smaller on the opposite side, whereby the drainage property is improved.

Moreover, a ratio (fibrous substance 16/carbon particle 14) of a fiber diameter of the fibrous substance 16 and a particle diameter of the carbon particle 14 preferably falls within a range of 0.01 to 10, more preferably a range of 0.1 to 8. When the ratio falls within the range described above, the pores are likely to be formed in the electrode catalyst layers 2 and 3, and the drainage property is likely to be improved. The fiber diameter of the fibrous substance 16 and the particle diameter of the carbon particle 14 are observed with an optical microscope, a scanning electron microscope (SEM), a transmission electron microscope (TEM) or the like, and the fiber diameter of the fibrous substance 16 and the particle diameter of the carbon particle 14 can be obtained by measuring the diameters and calculating the average value thereof.

Any substance may be used as the polymer electrolyte 15 as long as it has ion conductivity. Considering the adhesion between the electrode catalyst layers 2 and 3 with the polymer electrolyte membrane, it is preferable to select a material with the same characteristics as the polymer electrolyte membrane. As the polymer electrolyte 15, for example, a fluorine-based resin and a hydrocarbon-based resin can be used. The exemplified fluorine-based resin is Nafion (registered trademark, manufactured by Du Pont Co., Ltd.). As the hydrocarbon-based resin, an engineering plastic or a copolymer obtained by introducing a sulfonic acid group into the copolymer of the engineering plastic can be employed. The content of the polymer electrolyte 15 preferably falls within a range of 10 mass % to 200 mass % with respect to the total mass of the carbon particles 14 and the fibrous material 16, more preferably a range of 30 mass % to 150 mass %. In a case where the content of the polymer electrolyte 15 is less than 10 mass %, the proton conductivity is lowered and the power generation performance may be deteriorated. In a case where the content of the polymer electrolyte 15 is more than 200 mass %, the flooding occurs and the power generation performance may be deteriorated.

Examples of the catalyst 13 include platinum group elements and metals, with alloys, oxides, mixed oxides, or the like thereof. Examples of platinum group elements include platinum, palladium, ruthenium, iridium, rhodium and osmium. Exemplified metals include iron, lead, copper, chromium, cobalt, nickel, manganese, vanadium, molybdenum, gallium, aluminum and the like. Among these, platinum or a platinum alloy is preferable as the catalyst 13. In a case where a particle diameter of the catalyst 13 is too large, the activity of the catalyst 13 may be deteriorated. In a case where the particle diameter is too small, the stability of the catalyst 13 may decrease. Therefore, it preferably falls within a range of 0.5 nm to 20 nm, more preferably a range of 1 nm to 5 nm.

As the carbon particles 14, any particles may be used as long as they are particulate, have electrical conductivity and are not affected by the catalyst 13. In a case where a particle diameter of the carbon particles 14 is too small, an electron conduction path may be difficult to be formed. Meanwhile, in a case where the particle diameter of the carbon particles 14 is too large, the electrode catalyst layers 2 and 3 become thick and the resistance increases, which may deteriorate the output characteristics. Therefore, the particle diameter of the carbon particles 14 preferably falls within a range of 10 nm to 1000 nm, more preferably a range of 10 nm to 100 nm.

It is preferable that the catalyst 13 is carried on the carbon particles 14. By carrying the catalyst 13 on the carbon particle 14 with a high surface area, the catalyst 13 can be carried at a high density and the catalytic activity can be improved. In particular, when the total mass of the carbon particles 14 and the catalyst 13 is 100 mass %, the mass of the catalyst 13 preferably falls within a range of 5 mass % to 80 mass %, more preferably a range of 10 mass % to 60 mass %. In a case where the mass of the catalyst 13 is larger than 80 mass %, the distance between the catalysts is short, whereby the catalysts agglomerate and coarsen during operation and the catalytic activity is likely to decrease. In a case where the mass of the catalyst 13 is smaller than 5 mass %, the catalyst 13 cannot be uniformly carried on the surface of the carbon particle 14, whereby the catalyst 13 is unevenly distributed, coagulated and coarsened, and the catalytic activity is likely to decrease.

As the fibrous material 16, for example, an electron conductive fiber and a proton conductive fiber can be used. As for the fibrous material 16, one of the following fibers may be used alone, or two or more kinds thereof may be used in combination. The electron conductive fiber and the proton conductive fiber may also be used in combination.

Examples of the electron conductive fiber according to the embodiment include a carbon fiber, a carbon nanotube, a carbon nanohorn, a conductive polymer nanofiber, and the like. In particular, a carbon nanofiber is preferable in terms of conductivity and dispersibility. Further, it is more preferable to use an electron conductive fiber having catalytic ability in order to reduce the use amount of catalyst made of a noble metal. In a case where the catalyst layer for a polymer electrolyte fuel cell according to the embodiment is used as an air electrode of a polymer electrolyte fuel cell, for example, a carbon alloy catalyst prepared from the carbon nanofibers can be employed as the electron conductive fiber. Alternatively, the electrode active material for the oxygen reduction electrode processed into a fibrous form may be used. For example, a material containing at least one transition metal element selected from Ta, Nb, Ti, and Zr may also be used. Partial oxides of carbonitrides of these transition metal elements, or conductive oxides and conductive oxynitrides of these transition metal elements can be adopted.

As the proton conductive fiber according to the embodiment, any polymer electrolyte having proton conductivity processed into a fibrous form may be used. For example, it is possible to use a fluorine-based polymer electrolyte or a hydrocarbon-based polymer electrolyte. Examples of the fluorine-based polymer electrolyte include Nafion (registered trademark) manufactured by Du Pont Co., Ltd., Flemion (registered trademark) manufactured by Asahi Glass Co., Ltd., Aciplex (registered trademark) manufactured by Asahi Kasei Corporation, Gore Select (registered trademark) manufactured by Gore Co., Ltd., and the like. Examples of the hydrocarbon-based polymer electrolyte include electrolytes such as sulfonated polyether ketone, sulfonated polyether sulfone, sulfonated polyether ether sulfone, sulfonated polysulfide, sulfonated polyphenylene and the like. Among these, Nafion (registered trademark)-based material manufactured by Du Pont Co., Ltd. can be suitably used as the polymer electrolyte. Examples of the hydrocarbon-based polymer electrolyte include electrolytes such as sulfonated polyether ketone, sulfonated polyether sulfone, sulfonated polyether ether sulfone, sulfonated polysulfide, sulfonated polyphenylene and the like.

The fiber diameter of the fibrous material 16 preferably falls within a range of 0.5 nm to 500 nm, more preferably a range of 10 nm to 300 nm. When the fiber diameter falls within the range described above, the number of the pores in the electrode catalyst layers 2 and 3 can be increased and the high output can be achieved. The fiber diameter of the fibrous substance 16 is observed with an optical microscope, a scanning electron microscope (SEM), a transmission electron microscope (TEM) or the like, and the fiber diameter of the fibrous material 16 can be obtained by measuring the diameter of the fibrous material 16 and calculating the average value thereof.

The ratio (fibrous material 16/carbon particle 14) of the fiber diameter of the fibrous substance 16 and the particle diameter of the carbon particle 14 preferably falls within a range of 0.001 to 50. When the ratio falls within the range described above, the pores are likely to be formed in the electrode catalyst layers 2 and 3, and the drainage properties is likely to be improved.

A fiber length of the fibrous substance 16 preferably falls within a range of 1 μm to 200 μm, more preferably a range of 1 μm to 50 μm. When the fiber length falls within the range described above, it is possible to enhance the strength of the electrode catalyst layers 2 and 3 and to suppress occurrence of cracks during formation. Furthermore, it is possible to increase the pores in the electrode catalyst layers 2 and 3, thereby implementing the high output. The fiber length of the fibrous substance 16 is observed with an optical microscope, a scanning electron microscope (SEM), a transmission electron microscope (TEM) or the like, and the fiber length of the fibrous substance 16 can be obtained by measuring the length of the fibrous material 16 and calculating the average value thereof.

The content of the fibrous material 16 preferably falls within a range of 10 mass % to 250 mass %, more preferably a range of 10 mass % to 200 mass %, with respect to the mass of the carbon particles 14. In a case where it is less than 10 mass % with respect to the mass of the carbon particles 14, the gas diffusion properties and drainage property may be deteriorated. In a case where it is more than 250 mass % with respect to the mass of the carbon particles 14, a specific surface area of a conductor (the carbon particles 14 and the conductive fibers) for carrying the catalyst 13 decreases, the catalyst 13 cannot be densified, and thus the catalytic activity may decrease.

A thickness of the respective electrode catalyst layers 2 and 3 preferably falls within a range of 5 μm to 30 μm, more preferably a range of 5 μm to 20 μm. In a case where the thickness of the respective electrode catalyst layers 2 and 3 is smaller than 5 μm, it is not desirable since the concentration of water generated by power generation tends to be high in the electrode catalyst layers 2 and 3, flooding is likely to occur, and thus the power generation performance may decrease. In a case where the thickness of the respective electrode catalyst layers 2 and 3 is larger than 30 μm, the resistance of the electrode catalyst layers 2 and 3 increases, and thus the output may decrease.

The anode-side electrode catalyst layer 3 may have a thickness same as or different from that of the cathode-side electrode catalyst layer 2. In a case where the cathode-side electrode catalyst layer 2 has a thickness larger than that of the anode-side electrode catalyst layer 3, the drainage property is further improved. If the cathode-side electrode catalyst layer 2 is thicker, it is easy to drain water generated by power generation out of the system. Since a dried fuel is used for the anode, if the anode-side electrode catalyst layer 3 is thinner, the anode-side electrode catalyst layer 3 is easily dried. Therefore, generated water on the cathode side moves to the anode side through the polymer electrolyte membrane 1. Consequently, the amount of water in the cathode-side electrode catalyst layer 2 can be appropriately maintained, and drainage property can be enhanced.

(Membrane Electrode Assembly)

Figure 2:
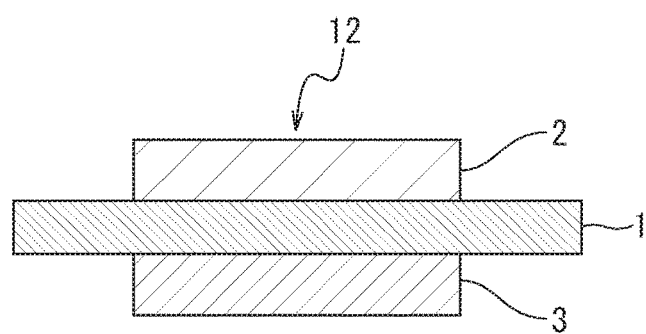
FIG. 2 is a cross-sectional view illustrative of a configuration example of a membrane electrode assembly according to an embodiment of the present invention.

The membrane electrode assembly 12 for a polymer electrolyte fuel cell according to the embodiment has, for example, a structure as shown in the cross-sectional view of FIG. 2. The membrane electrode assembly 12 includes the polymer electrolyte membrane 1, the cathode-side electrode catalyst layer 2 formed on one side of the polymer electrolyte membrane 1, and the anode-side electrode catalyst layer 3 formed on the other side of the polymer electrolyte membrane 1. The electrode catalyst layer according to the present embodiment corresponds to either or both of the cathode-side electrode catalyst layer 2 and the-anode side electrode catalyst layer 3.

(Polymer Electrolyte Fuel Cell)

Figure 3:
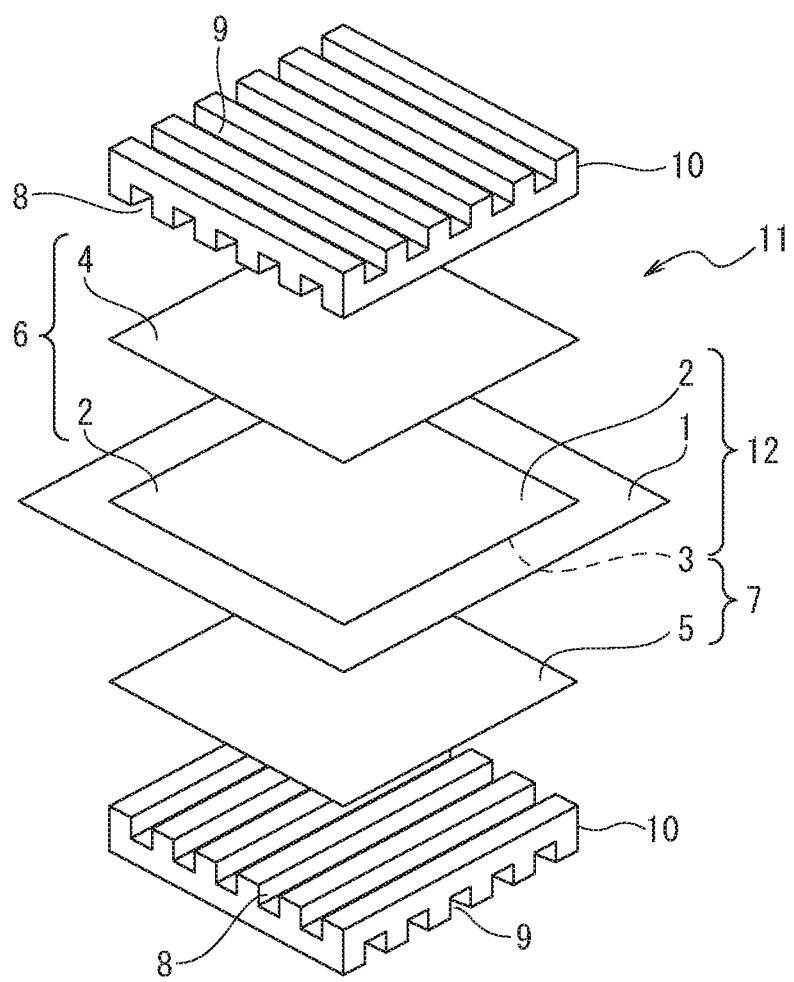
FIG. 3 is an exploded cross-sectional view illustrative of a configuration example of a unit cell of a polymer electrolyte fuel cell equipped with the membrane electrode assembly.

In the polymer electrolyte fuel cell according to this embodiment, as shown in FIG. 3, an air electrode-side gas diffusion layer 4 and a fuel electrode-side gas diffusion layer 5 are respectively arranged to oppose to the cathode-side electrode catalyst layer 2 and the anode-side electrode catalyst layer 3 of the membrane electrode assembly 12. Accordingly, the air electrode 6 is formed of the cathode-side electrode catalyst layer 2 and the air electrode-side gas diffusion layer 4, and the fuel electrode 7 is formed of the anode-side electrode catalyst layer 3 and the fuel electrode-side gas diffusion layer 5. A unit-cell polymer electrolyte fuel cell 11 is then formed by sandwiching the air electrode 6 and the fuel electrode 7 with a pair of separators 10. A pair of separators 10 is made of a conductive and gas-impermeable material, and has a gas flow path 8 for reaction gas flow, which is arranged facing the air electrode-side gas diffusion layer 4 or the fuel electrode-side gas diffusion layer 5, and a cooling water flow path 9 for circulating the cooling water, which is arranged on a main surface opposite to the gas flow path 8.

In the polymer electrolyte fuel cell 11, an oxidant such as air or oxygen is supplied to the air electrode 6 through the gas flow path 8 of one of the separators 10, while fuel gas or organic fuel containing hydrogen is supplied to the fuel electrode 7 through the gas flow path 8 of the other one of the separators 10, thereby generating power.

(Fabrication of Electrode Catalyst Layer)

The electrode catalyst layers 2 and 3 can be fabricated by preparing a catalyst layer slurry, and coating and drying the prepared catalyst layer slurry on a substrate or the like.

The catalyst layer slurry contains the catalyst 13, the carbon particles 14, the polymer electrolyte 15, the fibrous material material 16 and a solvent. The solvent is not particularly limited as long as it is capable of dispersing or dissolving the polymer electrolyte 15. General examples of the solvent include water; alcohols such as methanol, ethanol, 1-propanol, 2-propanol, 1-butanol, 2-butanol, isobutyl alcohol, tert-butyl alcohol, and the like; ketones such as acetone, methyl ethyl ketone, methyl propyl ketone, methyl butyl ketone, methyl isobutyl ketone, methyl amyl ketone, pentanone, heptanone, cyclohexanone, methylcyclohexanone, acetonylacetone, diethyl ketone, dipropyl ketone, diisobutyl ketone, and the like; ethers such as tetrahydrofuran, tetrahydropyran, dioxane, diethylene glycol dimethyl ether, anisole, methoxytoluene, diethyl ether, dipropyl ether, dibutyl ether, and the like; amines such as isopropylamine, butylamine, isobutylamine, cyclohexylamine, diethylamine, aniline, and the like; esters such as propyl formate, isobutyl formate, amyl formate, methyl acetate, ethyl acetate, propyl acetate, butyl acetate, isobutyl acetate, pentyl acetate, isopentyl acetate, methyl propionate, ethyl propionate, butyl propionate, and the like; other acetic acid, propionic acid, dimethylformamide, dimethylacetamide, N-methylpyrrolidone, and the like. Examples of glycol- or glycol ether-based solvents include ethylene glycol, diethylene glycol, propylene glycol, ethylene glycol monomethyl ether, ethylene glycol dimethyl ether, ethylene glycol diethyl ether, diacetone alcohol, 1-methoxy-2-propanol, 1-ethoxy-2-propanol, and the like.

Exemplified methods of coating the catalyst layer slurry include, but are not particularly limited to, various coating methods such as doctor blade method, die coating method, dipping method, screen printing method, laminator roll coating method, spray method, and the like.

As a drying method of the catalyst layer slurry, warm air drying, IR drying and the like can be employed. The drying temperature falls within a range of 40 to 200° C., preferably a range of 40 to 120° C. The drying time falls within a range of 0.5 minutes to 1 hour, preferably a range of 1 minute to 30 minutes.

It is possible to set the density of the electrode catalyst layers 2 and 3 to fall within a range of 400 mg/cm$^3$ to 1000 mg/cm$^3$ by adjusting conditions such as addition amount and fiber length of the fibrous material material 16, heating temperature for drying, temperature gradient, pressurization in the film thickness direction applied until the electrode catalyst layer is dried, and the like.

(Fabrication of Membrane Electrode Assembly)

As a method of fabricating the membrane electrode assembly 12, for example, the electrode catalyst layers 2 and 3 may be formed on a transfer substrate or the gas diffusion layers 4 and 5 and then formed on the polymer electrolyte membrane 1 by thermocompression bonding, or the electrode catalyst layers 2 and 3 may be directly formed on the polymer electrolyte membrane 1. In a case where the electrode catalyst layers 2 and 3 are directly formed on the polymer electrolyte membrane 1, it is preferable because the adhesion between the polymer electrolyte membrane 1 and the electrode catalyst layers 2 and 3 is high, and the risk of the electrode catalyst layers 2 and 3 being crushed is low.

As described above, the electrode catalyst layers 2 and 3 respectively include the catalyst 13, the carbon particles 14, the polymer electrolyte 15 and the fibrous material 16, and have the density falling within a range of 400 mg/cm$^3$ to 1000 mg/cm$^3$, preferably a range of 500 mg/cm$^3$ to 900 mg/cm$^3$. The mass of the polymer electrolyte 15 may fall within a range of 20 mass % to 200 mass % with respect to the total mass of the carbon particles 14 and the fibrous material 16.

According to this configuration, it is possible to provide the electrode catalyst layer for a polymer electrolyte fuel cell, which is capable of improving drainage property and gas diffusion properties and capable of high output.

The electrode catalyst layers 2 and 3 according to the embodiment are extremely suitably applied to, for example, a polymer electrolyte fuel cell.

A case where the catalyst 13 is carried on the carbon particles 14 has been described in the embodiment, however, the catalyst 13 may be carried on the fibrous material 16, or may be carried on any of the carbon particles 14 and the fibrous material 16. The voids formed by the fibrous material 16 can serve as a discharge path of water generated by power generation. In a case where the catalyst 13 is carried on the fibrous material 16, the electrode reaction also occurs in the discharge path of the generated water. Meanwhile, in a case where the catalyst 13 is carried on the carbon particles 14, it is preferable because the drainage property of the electrode catalyst layer can be enhanced since a reaction point by the three-phase interface due to the carbon particles 14, the catalyst 13 and the gas is distinguishable from the discharge path of the generated water due to a space formed by the fibrous material 16.

Next, an example based on the present invention will be described.

[Calculation of Density]

The density is determined from the mass and thickness of the electrode catalyst layers 2 and 3. The mass or the dry mass calculated from the slurry coating amount for catalyst layers is employed as the mass of the electrode catalyst layers 2 and 3. When the mass of the electrode catalyst layers 2 and 3 is determined from the coating amount, the solid content (mass %) of the catalyst layer slurry is determined in advance, thereby determining the mass of the electrode catalyst layers 2 and 3 from the predetermined coating amount and the solid content mass. When the mass of the electrode catalyst layers 2 and 3 is determined from the dry mass, the electrode catalyst layers 2 and 3 are processed into pieces with a predetermined size, and the mass thereof is measured and determined. The thickness of the electrode catalyst layers 2 and 3 is obtained by observing the cross-section with a scanning electron microscope (magnification: 2000 times), measuring the thickness of the electrode catalyst layers 2 and 3, and calculating the average value thereof.

[Evaluation of Power Generation Property]

A gas diffusion layer (SIGRACET (registered trademark) 35BC, manufactured by SGL) is arranged on the outside of the electrode catalyst layers 2 and 3 to evaluate power generation property using a commercially available JARI standard cell. The cell temperature is set to 80° C. Hydrogen (100% RH) is supplied to the anode and air (100% RH) is supplied to the cathode.

[Calculation of Fiber Diameter of Fibrous Substance and Particle Diameter of Carbon Particle]

The fiber diameter of the fibrous substance 16 and the particle diameter of the carbon particle 14 are obtained by observing the cross-section with a scanning electron microscope (magnification: 30000 times), measuring the fiber diameter of the fibrous substance 16 and the particle diameter of the carbon particle 14, and calculating their average values (from 10 points).

FIRST EXAMPLE

Example 1-1

The electrode catalyst layer was formed such that the thickness and density of the electrode catalyst layer were as described in Table 2.

20 g of a platinum-carrying carbon (TEC10E50E, manufactured by Tanaka Kikinzoku Kogyo K.K.) was placed in a vessel and mixed with water. 1-propanol, an electrolyte (Nafion (registered trademark), dispersion, manufactured by Wako Pure Chemical Industries, Ltd.), and 10 g of a carbon nanofiber (product name "VGCF", manufactured by Showa Denko K.K., fiber diameter of about 150 nm, fiber length of about 10 μm), as the fibrous substance, were added to the mixture. The resultant mixture was stirred to prepare a catalyst layer slurry.

The prepared catalyst layer slurry was coated on a polymer electrolyte membrane (Nafion 212, manufactured by Du Pont, Co., Ltd.) by using die coating method, and was dried in an oven at 80° C., thereby obtaining a membrane electrode assembly with the electrode catalyst layer of Example 1-1.

Example 1-2

A membrane electrode assembly with the electrode catalyst layer of Example 1-2 was obtained with the same procedure as in Example 1-1 except that the carbon nanotube (fiber diameter of about 1 nm, fiber length of about 1 μm) was used as the fibrous substance.

Example 1-3

A membrane electrode assembly with the electrode catalyst layer of Example 1-3 was obtained with the same procedure as in Example 1-1 except that the dry temperature was set to be higher.

Example 1-4

A membrane electrode assembly with the electrode catalyst layer of Example 1-4 was obtained with the same procedure as in Example 1-1 except that the amount of the fibrous material was increased.

Comparative Example 1-1

A membrane electrode assembly with the electrode catalyst layer of Comparative Example 1-1 was obtained with the same procedure as in Example 1-1 except that the catalyst layer slurry was coated on a PET substrate and transferred to the electrolyte membrane by thermocompression bonding.

Comparative Example 1-2

A membrane electrode assembly with the electrode catalyst layer of Comparative Example 1-2 was obtained with the same procedure as in Example 1-1 except that the fibrous material were not added.

Comparative Example 1-3

A membrane electrode assembly with the electrode catalyst layer of Comparative Example 1-3 was obtained with the same procedure as in Example 1-1 except that the fibrous material were not added, and the electrode catalyst layer was coated on a PET substrate and transferred to the electrolyte membrane by thermocompression bonding.

Each of the catalyst layers of Examples 1-1 to 1-4 and Comparative Examples 1-1 to 1-3 was observed with a microscope (magnification: 200 times) to evaluate whether or not a crack of 10 μm or more was exhibited. The evaluation results are summarized in Table 1.

TABLE 1

| Example 1-1 | No crack |
| Example 1-2 | No crack |
| Example 1-3 | No crack |
| Example 1-4 | No crack |
| Comp. Example 1-1 | No crack |
| Comp. Example 1-2 | Crack occurred |
| Comp. Example 1-3 | No crack |

As shown in Table 1, in a case where the fibrous material were not added (Comparative Example 1-2), the catalyst layer slurry could be coated on the PET film without cracks, but many cracks occurred in the polymer electrolyte membrane. Meanwhile, the electrode catalyst layers in which the fibrous material were added (Examples 1-1 to 1-4 and Comparative Example 1-1) exhibited no crack.

Furthermore, the density and power generation property were evaluated for each of the electrode catalyst layers of Examples 1-1 to 1-4 and Comparative Examples 1-1 to 1-3. The evaluation results are summarized in Table 2.

The mass of the catalyst to be blended was adjusted to be the same in each of the electrode catalyst layers, however, the thickness of each of the electrode catalyst layers was different since other factors were different.

TABLE 2

| | Thickness of Electrode Catalyst Layer [μm] | Density of Electrode Catalyst Layer [mg/cm$^3$] | Power Generation Performance [mW/cm$^2$] |
| --- | --- | --- | --- |
| Example 1-1 | 19.2 | 861 | 856 |
| Example 1-2 | 18.8 | 880 | 813 |
| Example 1-3 | 21.3 | 756 | 881 |

TABLE 2-continued

|  | Thickness of Electrode Catalyst Layer [μm] | Density of Electrode Catalyst Layer [mg/cm³] | Power Generation Performance [mW/cm²] |
|---|---|---|---|
| Example 1-4 | 27.7 | 521 | 847 |
| Comp. Ex. 1-1 | 18.2 | 910 | 772 |
| Comp. Ex. 1-2 | 11 | 970 | 720 |
| Comp. Ex. 1-3 | 11 | 990 | 714 |

From the results summarized in Tables 1 and 2, it is recognized that a crack is likely to occur even if the density is higher than that of the present invention when the fibrous material are not added.

According to the embodiment, it is possible to provide the electrode catalyst layer for a polymer electrolyte fuel cell, in which a crack does not occur and which is capable of improving drainage property and gas diffusion properties and capable of high output, by employing the electrode catalyst layers 2 and 3, each of which includes the catalyst 13, the carbon particles 14, the polymer electrolyte 15 and the fibrous material 16, and has the density falling within a range of 500 mg/cm³ to 900 mg/cm³.

In a case where the density is 400 mg/cm³ or more, although the power generation performance is reduced compared to a case where the density is 500 mg/cm³ to 900 mg/cm³, the power generation performance is improved compared to the prior art, and thus there is no problem in use.

In a case where the density is 1000 mg/cm³ or less, although the power generation performance is reduced compared to a case where the density is 500 mg/cm³ to 900 mg/cm³, the power generation performance is improved compared to the prior art, and thus there is no problem in use.

SECOND EXAMPLE

Example 2-1

The electrode catalyst layer was formed such that the thickness and density of the electrode catalyst layer were as described in Table 3.

A platinum-carrying carbon (TEC10E50E, manufactured by Tanaka Kikinzoku Kogyo K.K.) was placed in a vessel and mixed with water. 1-propanol, an electrolyte (Nafion (registered trademark), dispersion, manufactured by Wako Pure Chemical Industries, Ltd.), and a carbon nanofiber (product name "VGCF", manufactured by Showa Denko K.K., fiber diameter of about 150 nm, fiber length of about 10 μm), as the fibrous substance, were added to the mixture. The resultant mixture was stirred to prepare a catalyst layer slurry. The mass of the polymer electrolyte was 75 mass % with respect to the total mass of the carbon particles and the fibrous material, and the mass of the fibrous material was 100 mass % with respect to the mass of the carbon particles.

The prepared catalyst layer slurry was coated on a polymer electrolyte membrane (Nafion 212, manufactured by Du Pont, Co., Ltd.) by using die coating method, and was dried in an oven at 80° C., thereby obtaining a membrane electrode assembly with the electrode catalyst layer of Example 2-1.

Example 2-2

A membrane electrode assembly with the electrode catalyst layer of Example 2-2 was obtained with the same procedure as in Example 2-1 except that the mass of the polymer electrolyte was 100 mass % with respect to the total mass of the carbon particles and the fibrous material.

Example 2-3

A membrane electrode assembly with the electrode catalyst layer of Example 2-3 was obtained with the same procedure as in Example 2-1 except that the mass of the polymer electrolyte was 15 mass % with respect to the total mass of the carbon particles and the fibrous material.

Example 2-4

A membrane electrode assembly with the electrode catalyst layer of Example 2-4 was obtained with the same procedure as in Example 2-1 except that the carbon nanotube (fiber diameter of about 1 nm, fiber length of about 1 μm) was used as the fibrous substance.

Example 2-5

A membrane electrode assembly with the electrode catalyst layer of Example 2-5 was obtained with the same procedure as in Example 2-1 except that the mass of the polymer electrolyte was 42 mass % with respect to the total mass of the carbon particles and the fibrous material, and the mass of the fibrous material was 260 mass % with respect to the mass of the carbon particles.

Example 2-6

A membrane electrode assembly with the electrode catalyst layer of Example 2-6 was obtained with the same procedure as in Example 2-1 except that the mass of the polymer electrolyte was 54 mass % with respect to the total mass of the carbon particles and the fibrous material, and the mass of the fibrous material was 180 mass % with respect to the mass of the carbon particles.

Example 2-7

A membrane electrode assembly with the electrode catalyst layer of Example 2-7 was obtained with the same procedure as in Example 2-1 except that the mass of the polymer electrolyte was 100 mass % with respect to the total mass of the carbon particles and the fibrous material, and the mass of the fibrous material was 50 mass % with respect to the mass of the carbon particles.

Example 2-8

A membrane electrode assembly with the electrode catalyst layer of Example 2-8 was obtained with the same procedure as in Example 2-1 except that the mass of the polymer electrolyte was 130 mass % with respect to the total mass of the carbon particles and the fibrous material, and the mass of the fibrous material was 15 mass % with respect to the mass of the carbon particles.

Example 2-9

A membrane electrode assembly with the electrode catalyst layer of Example 2-9 was obtained with the same procedure as in Example 2-1 except that the mass of the polymer electrolyte was 139 mass % with respect to the total mass of the carbon particles and the fibrous material, and the mass of the fibrous material was 8 mass % with respect to the mass of the carbon particles.

Example 2-10

A membrane electrode assembly with the electrode catalyst layer of Example 2-10 was obtained with the same procedure as in Example 2-1 except that TEC10E70TPM (manufactured by Tanaka Kikinzoku Kogyo K.K.) was used as the platinum-carrying carbon.

Example 2-11

A membrane electrode assembly with the electrode catalyst layer of Example 2-11 was obtained with the same procedure as in Example 2-1 except that TEC10E60TPM (manufactured by Tanaka Kikinzoku Kogyo K.K.) was used as the platinum-carrying carbon.

Example 2-12

A membrane electrode assembly with the electrode catalyst layer of Example 2-12 was obtained with the same procedure as in Example 2-1 except that TEC10E40E (manufactured by Tanaka Kikinzoku Kogyo K.K.) was used as the platinum-carrying carbon.

Example 2-13

A membrane electrode assembly with the electrode catalyst layer of Example 2-13 was obtained with the same procedure as in Example 2-10 except that the catalyst layer slurry was dried at 100° C.

Example 2-14

A membrane electrode assembly with the electrode catalyst layer of Example 2-14 was obtained with the same procedure as in Example 2-11 except that the catalyst layer slurry was dried at 100° C.

Example 2-15

A membrane electrode assembly with the electrode catalyst layer of Example 2-15 was obtained with the same procedure as in Example 2-1 except that the catalyst layer slurry was coated on a PET substrate and transferred to the electrolyte membrane by thermocompression bonding.

Example 2-16

A membrane electrode assembly with the electrode catalyst layer of Example 2-16 was obtained with the same procedure as in Example 2-2 except that the catalyst layer slurry was coated on a PET substrate and transferred to the electrolyte membrane by thermocompression bonding.

Example 2-17

A membrane electrode assembly with the electrode catalyst layer of Example 2-17 was obtained with the same procedure as in Example 2-8 except that TEC10E70TPM (manufactured by Tanaka Kikinzoku Kogyo K.K.) was used as the platinum-carrying carbon and the coating amount was adjusted such that the thickness of the electrode catalyst layer was 5 μm or less.

Example 2-18

A membrane electrode assembly with the electrode catalyst layer of Example 2-18 was obtained with the same procedure as in Example 2-1 except that the coating amount was halved.

Example 2-19

A membrane electrode assembly with the electrode catalyst layer of Example 2-19 was obtained with the same procedure as in Example 2-4 except that the carbon particles (particle diameter of about 120 nm) were used as the platinum-carrying carbon.

Example 2-20

A membrane electrode assembly with the electrode catalyst layer of Example 2-20 was obtained with the same procedure as in Example 2-1 except that the mass of the polymer electrolyte was 7 mass % with respect to the total mass of the carbon particles and the fibrous material, and the mass of the fibrous material was 180 mass % with respect to the mass of the carbon particles.

Comparative Example 2-1

A membrane electrode assembly with the electrode catalyst layer of Comparative Example 2-1 was obtained with the same procedure as in Example 2-15 except that the pressure for thermocompression bonding was doubled.

Comparative Example 2-2

A membrane electrode assembly with the electrode catalyst layer of Comparative Example 2-2 was obtained with the same procedure as in Example 2-1 except that the mass of the polymer electrolyte was 204 mass % with respect to the total mass of the carbon particles and the fibrous material, and the mass of the fibrous material was 8 mass % with respect to the mass of the carbon particles.

Comparative Example 2-3

A membrane electrode assembly with the electrode catalyst layer of Comparative Example 2-3 was obtained with the same procedure as in Example 2-1 except that the mass of the polymer electrolyte was 150 mass % with respect to the total mass of the carbon particles and the fibrous material, and the mass of the fibrous material was 0 mass % with respect to the mass of the carbon particles. Cracks occurred in the catalyst layer.

[Comparison Results]

Composition of the electrode catalyst layer, thickness of the electrode catalyst layer, density of the electrode catalyst layer and power generation performance for each of the polymer electrolyte fuel cells, respectively provided with the membrane electrode assemblies of Examples 2-1 to 2-20 and Comparative Examples 2-1 to 2-3, are summarized in Table 3.

Regarding the power generation performance, a case where the voltage at a current density of 1.0 A/cm$^2$ is 0.55 V or more was evaluated as "Δ", a case where the voltage is 0.58 V or more was evaluated as "○", a case where the voltage is 0.61 V or more was evaluated as "⊙", and a case where the voltage is less than 0.55 V was evaluated as "x". Even though the higher the power generation performance is the more preferable it is, it was judged that a membrane electrode assembly does not have any problem in use as long as the voltage was 0.55 V or more.

TABLE 3

|  | Density of Electrode Catalyst Layer [mg/cm³] | Mass of Polymer Electrolyte [wt %] | Ratio of Fiber Diameter to Particle Diameter [Fiber Diameter/ Particle Diameter] | Mass of Fibrous material [wt %] | Thickness of Electrode Catalyst Layer [μm] | Power Generation Performance |
|---|---|---|---|---|---|---|
| Example 2-1 | 839 | 75 | 2.55 | 100 | 23.5 | ⊚ |
| Example 2-2 | 886 | 100 | 5.98 | 100 | 24.8 | ⊚ |
| Example 2-3 | 689 | 15 | 3.42 | 100 | 20.8 | ⊚ |
| Example 2-4 | 861 | 75 | 0.017 | 100 | 22.9 | ⊚ |
| Example 2-5 | 813 | 42 | 2.95 | 260 | 33.1 | Δ |
| Example 2-6 | 821 | 54 | 2.42 | 180 | 28.4 | ⊚ |
| Example 2-7 | 940 | 100 | 3.27 | 50 | 18.6 | ○ |
| Example 2-8 | 970 | 130 | 3.86 | 15 | 16.4 | ○ |
| Example 2-9 | 987 | 139 | 2.25 | 8 | 15.8 | Δ |
| Example 2-10 | 506 | 75 | 2.14 | 100 | 20.8 | ⊚ |
| Example 2-11 | 634 | 75 | 2.66 | 100 | 22.3 | ⊚ |
| Example 2-12 | 809 | 75 | 2.27 | 100 | 32 | Δ |
| Example 2-13 | 430 | 75 | 1.81 | 100 | 24.5 | ○ |
| Example 2-14 | 587 | 75 | 2.8 | 100 | 24.1 | ⊚ |
| Example 2-15 | 930 | 75 | 1.76 | 100 | 21.2 | ○ |
| Example 2-16 | 939 | 100 | 2.16 | 100 | 23.4 | ○ |
| Example 2-17 | 951 | 130 | 1.98 | 15 | 4.7 | Δ |
| Example 2-18 | 843 | 75 | 1.87 | 100 | 11.7 | ⊚ |
| Example 2-19 | 435 | 75 | 0.008 | 100 | 45.3 | Δ |
| Example 2-20 | 615 | 7 | 2.07 | 180 | 28.4 | Δ |
| Comp. Ex. 2-1 | 1038 | 75 | 3.71 | 100 | 19 | X |
| Comp. Ex. 2-2 | 986 | 204 | 2.67 | 8 | 19 | X |
| Comp. Ex. 2-3 | 1043 | 150 | 3.16 | 0 | 14.6 | X |

As shown in Table 3, according to the embodiment, it is possible to provide the membrane electrode assembly 12 for a polymer electrolyte fuel cell, having the excellent power generation performance, by employing the electrode catalyst layers 2 and 3, each of which includes the catalyst 13, the carbon particles 14, the polymer electrolyte 15 and the fibrous material 16, and has the density falling within a range of 500 mg/cm³ to 900 mg/cm³, or employing the electrode catalyst layers 2 and 3, in each of which the density falls within a range of 400 mg/cm³ to 1000 mg/cm³, and the mass of the polymer electrolyte 15 falls within a range of 10 mass % to 200 mass % with respect to the total mass of the carbon particles 14 and the fibrous material 16.

REFERENCE SIGNS LIST 1 polymer electrolyte membrane
2 cathode-side electrode catalyst layer
3 anode-side electrode catalyst layer
4 air electrode-side gas diffusion layer
5 fuel electrode-side gas diffusion layer
6 air electrode
7 fuel electrode
8 gas flow path
9 cooling water flow path
10 separator
11 polymer electrolyte fuel cell
12 membrane electrode assembly
13 catalyst
14 carbon particle
15 polymer electrolyte

The invention claimed is:

1. An electrode catalyst layer bonded to a polymer electrolyte membrane, the electrode catalyst layer comprising:
a catalyst;
carbon particles;
a polymer electrolyte; and
fibrous material,
wherein the electrode catalyst layer has a density falling within a range of 400 mg/cm³ to 1000 mg/cm³;
the mass of the polymer electrolyte falls within a range of 30 mass % to 150 mass % with respect to a total mass of the carbon particles and the fibrous material;
wherein the electrode catalyst layer has a thickness falling within a range of 5 μm to 30 μm; and
wherein a ratio (fibrous material/carbon particle) of a fiber diameter of the fibrous material and a particle diameter of the carbon particle falls within a range of 0.01 to 10.

2. The electrode catalyst layer according to claim 1, wherein the content of the fibrous material falls within a range of 50 mass % to 250 mass % with respect to the mass of the carbon particles.

3. The electrode catalyst layer according to claim 1, wherein an average fiber diameter of the fibrous substances falls within a range of 0.5 nm to 500 nm.

4. The electrode catalyst layer according to claim 1, wherein an average fiber length of the fibrous substances falls within a range of 1 μm to 200 μm.

5. The electrode catalyst layer according to claim 1, wherein the density falls within a range of 500 mg/cm³ to 900 mg/cm³.

6. An electrode catalyst layer bonded to a polymer electrolyte membrane, the electrode catalyst layer comprising:
a catalyst;
carbon particles;
a polymer electrolyte; and
fibrous material,
wherein the electrode catalyst layer has a density falling within a range of 400 mg/cm³ to 1000 mg/cm³;
the mass of the polymer electrolyte falls within a range of 30 mass % to 150 mass % with respect to a total mass of the carbon particles and the fibrous material;
wherein the electrode catalyst layer has a thickness falling within a range of 5 μm to 30 μm; and
wherein the content of the fibrous material falls within a range of 50 mass % to 250 mass % with respect to the mass of the carbon particles.

7. The electrode catalyst layer according to claim 6, wherein an average fiber diameter of the fibrous material falls within a range of 0.5 nm to 500 nm.

8. The electrode catalyst layer according to claim 6, wherein an average fiber length of the fibrous substances falls within a range of 1 μm to 200 μm.

9. The electrode catalyst layer according to claim 6, wherein the density falls within a range of 500 mg/cm$^3$ to 900 mg/cm$^3$.

10. The electrode catalyst layer according to claim 6, wherein a ratio (fibrous material/carbon particle) of a fiber diameter of the fibrous material and a particle diameter of the carbon particle falls within a range of 0.01 to 10.

* * * * *